(12) United States Patent
Sundström

(10) Patent No.: US 9,177,194 B2
(45) Date of Patent: Nov. 3, 2015

(54) SYSTEM AND METHOD FOR VISUALLY DISTINGUISHING FACES IN A DIGITAL IMAGE

(71) Applicant: Sony Corporation, Tokyo (JP)

(72) Inventor: Henrik Sundström, Lund (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 74 days.

(21) Appl. No.: 14/167,115

(22) Filed: Jan. 29, 2014

(65) Prior Publication Data

US 2015/0213305 A1 Jul. 30, 2015

(51) Int. Cl.
*G06K 9/00* (2006.01)
*G06K 9/78* (2006.01)
*G06F 17/30* (2006.01)
*H04N 5/232* (2006.01)

(52) U.S. Cl.
CPC ............ *G06K 9/00281* (2013.01); *G06F 17/30* (2013.01); *G06F 17/3025* (2013.01); *G06F 17/30259* (2013.01); *G06F 17/30265* (2013.01); *G06F 17/30274* (2013.01); *G06K 9/00228* (2013.01); *G06K 9/00288* (2013.01); *G06K 9/00308* (2013.01); *G06K 9/00677* (2013.01); *G06K 9/78* (2013.01); *H04N 5/232* (2013.01); *G06F 2216/01* (2013.01); *G06F 2216/03* (2013.01); *G06K 2009/00328* (2013.01); *G06K 2207/1012* (2013.01); *G06K 2209/21* (2013.01); *G06K 2209/27* (2013.01)

(58) Field of Classification Search
CPC ..................... G06F 17/30256; G06K 9/00268; G06K 9/00281; G06K 9/00295
USPC .......................................... 382/118, 103, 195
See application file for complete search history.

(56) References Cited

U.S. PATENT DOCUMENTS

| | | | | |
|---|---|---|---|---|
| 8,498,452 | B2 | 7/2013 | Steinberg et al. | |
| 2009/0232363 | A1* | 9/2009 | Ohashi et al. | 382/118 |
| 2010/0150450 | A1* | 6/2010 | Tsuji | 382/195 |

(Continued)

FOREIGN PATENT DOCUMENTS

| | | | |
|---|---|---|---|
| EP | 2 535 865 A1 | 12/2012 | |
| EP | 2 543 001 A2 | 1/2013 | |

(Continued)

OTHER PUBLICATIONS

Marziliano et al., "A No-Reference Perceptual Blur Metric", 2002 International Conference on Image Processing (vol. 3) 2002, 4 pages.

(Continued)

*Primary Examiner* — Mike Rahmjoo
(74) *Attorney, Agent, or Firm* — Renner, Otto, Boisselle & Sklar, LLP.

(57) ABSTRACT

A face is detected and identified in a digital image. A weight is calculated and assigned to the detected face based on characteristics of the face and social media connections between the person identified from the face and a target viewer of the digital image. One or more image effects are applied to the digital image to visually distinguish the detected face from other parts of the digital image and/or in relation to other faces detected in the image.

19 Claims, 3 Drawing Sheets

(56) References Cited

U.S. PATENT DOCUMENTS

2013/0262588 A1   10/2013   Barak et al.
2015/0131873 A1*   5/2015   Brandit et al. ................ 382/118

FOREIGN PATENT DOCUMENTS

WO   2011/017653 A1   2/2011
WO   2013/160539 A1   10/2013

OTHER PUBLICATIONS

Viola et al., "Rapid Object Detection using a Boosted Cascade of Simple Features", Accepted Conference on Computer Vision and Pattern Recognition, 2001, pp. 1-9.

Extended European Search Report for corresponding patent application No. 14190698.2 dated Jul. 3, 2015.

* cited by examiner

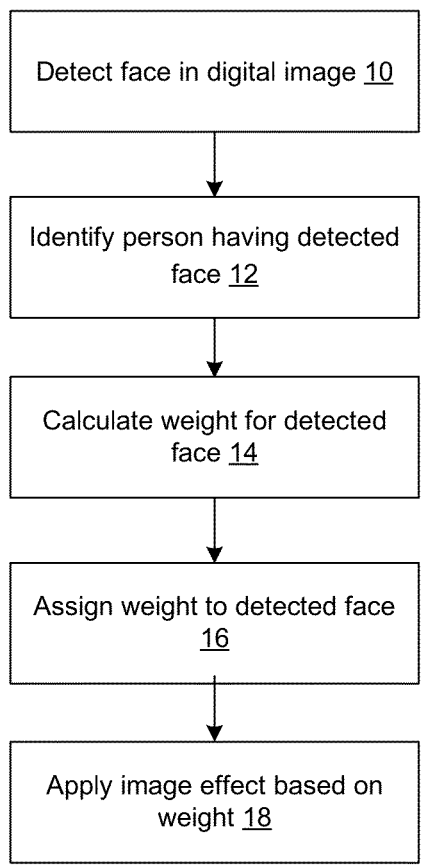
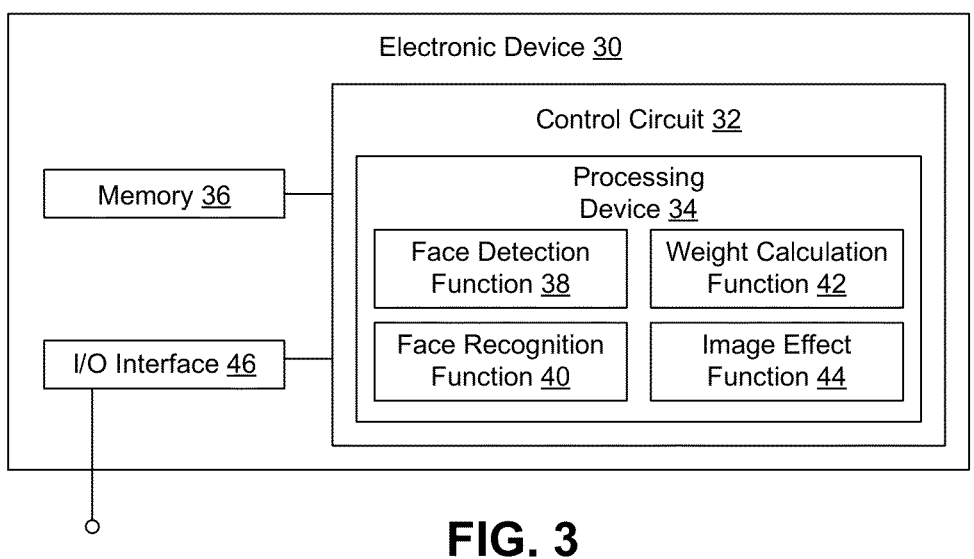

SYSTEM AND METHOD FOR VISUALLY DISTINGUISHING FACES IN A DIGITAL IMAGE

TECHNICAL FIELD OF THE INVENTION

The present technology relates generally to facial detection and recognition in a digital image, and more particularly, to a system and method for applying image effects based on weights calculated from social media connections and other metrics to visually distinguish a detected face from other parts of the digital image and/or in relation to other faces detected in the image.

BACKGROUND

Automated facial detection and recognition in digital images are emerging popular features as users of social media networks seek better methods of organizing and sharing their digital image libraries. Many software applications and methods exist for detecting faces in an image. Some applications go further by using facial recognition to identify specific people pictured in an image. The software may then draw attention to the faces by adding a box or outline to the image, or labeling the faces with names or other information for each identified person. Some applications crop each detected face and save each face in a separate image file. Existing face detection methods, however, treat all recognized faces in an image equally, applying the same effects to each face without regard to the viewer's actual social relationship to the person identified in the image. Currently, if a viewer wishes to alter an image so as to visually distinguish the most important people to him or her in an image, the viewer must do so manually.

SUMMARY

According to one aspect of the disclosure a method for applying image effects to a digital image in an electronic device, which includes a processor configured to execute logical instructions, includes detecting, with the processor, a face in the digital image, recognizing, with the processor, the identity of a person having the detected face, calculating, with the processor, a weight for the detected face, wherein the weight is calculated by analyzing a characteristic of the detected face and by analyzing a social media relationship between the identified person and a target viewer of the digital image, assigning, with the processor, the weight to the detected face, and applying an image effect to the digital image based on the weight assigned to the detected face to visually distinguish the detected face from other parts of the digital image.

According to an embodiment of the method, the weight assigned to the detected face is calculated by analyzing the prominence of the detected face with respect to the digital image.

According to an embodiment of the method, the weight assigned to the detected face is calculated by detecting a smile on the face.

According to an embodiment of the method, the weight assigned to the detected face is calculated by analyzing the degree to which the face is in focus with respect to the digital image.

According to an embodiment of the method, the weight assigned to the detected face is calculated by analyzing the extent to which the face is facing a viewer of the digital image.

According to an embodiment of the method, the weight assigned to the detected face is calculated by analyzing the quantity of social media contacts between the identified person and the target viewer.

According to an embodiment of the method, the weight assigned to the detected face is calculated by analyzing tags of the identified person in a album of the target viewer.

According to an embodiment of the method, the weight assigned to the detected face is calculated by analyzing the frequency of communications between the identified person and the target viewer in at least one communication medium.

According to an embodiment of the method, the weight assigned to the detected face is a sum of units calculated by increasing the weight by one unit for each of one or more characteristics of the detected face, and increasing the weight by one or more units for each of one or more social media relationships between the identified person and the target viewer.

According to an embodiment of the method, if the social media relationship comprises social media contacts between the identified person and the target viewer, then the weight is increased by one unit for each social media service in which the target viewer has a social media contact with the identified person.

According to an embodiment of the method, if the social media relationship comprises tags of the identified person in an album of the target viewer, then the weight is increased by one unit if the identified person is tagged in an album of the target viewer.

According to an embodiment of the method, if the social media relationship comprises communications between the identified person and the target viewer in one or more communication mediums, then the weight is increased by one unit for each other person identified from a detected face in the digital image that has a lower frequency of communications with the target viewer in the one or more communication mediums.

According to an embodiment of the method, the weight assigned to the detected face is a sum of units calculated by increasing the weight by one unit if a smile is detected on the detected face, increasing the weight by one unit if the detected face is facing a viewer of the digital image, increasing the weight by one unit if the detected face is in focus with respect to the digital image, increasing the weight by one unit for each other detected face in the digital image that is smaller than the detected face, increasing the weight by one unit for each social media service in which the target viewer has a social media contact with the identified person, increasing the weight by one unit if the identified person is tagged in an album of the target viewer, and increasing the weight by one unit for each other person identified from a detected face in the digital image that has a lower frequency of communications with the target viewer in one or more communication mediums.

According to an embodiment of the method, the assigning comprises storing the weight as metadata within the digital image.

According to an embodiment of the method, the method further comprises retrieving a digital image from an album of digital images based on metadata stored within the digital images.

According to an embodiment of the method, the image effect is one or more of altering the color balance between the detected face and other parts of the digital image, altering the brightness balance between the detected face and other parts of the digital image, or changing the focus of the detected face with respect to the digital image.

According to an embodiment of the method, the image effect includes displaying, near the detected face, information relating to the social media contacts between the identified person and the target viewer.

According to another aspect of the disclosure, an electronic device includes a memory and a control circuit configured to access a digital image stored the a memory, detect a face in the digital image, recognize the identity of a person having the detected face, calculate a weight for the detected face, wherein the weight is calculated by analyzing a characteristic of the detected face and by analyzing a social media relationship between the identified person and a target viewer of the digital image, assign the weight to the detected face, and apply at least one image effect to the digital image based on the weight assigned to the detected face to visually distinguish the detected face from other parts of the digital image.

According to another aspect of the disclosure, a non-transitory computer readable medium storing a computer program, when executed, is configured to access a digital image stored in a memory, detect a face in the digital image, recognize the identity of a person having the detected face, calculate a weight for the detected face, wherein the weight is calculated by analyzing a characteristic of the detected face and by analyzing a social media relationship between the identified person and a target viewer of the digital image, assign the weight to the detected face, and apply at least one image effect to the digital image based on the weight assigned to the detected face to visually distinguish the detected face from other parts of the digital image.

BRIEF DESCRIPTION OF THE DRAWINGS

FIG. 1 is a flow diagram representing exemplary steps for applying image effects to a digital image based on a weight assigned to a detected face.

FIG. 3 is a schematic view of an exemplary electronic device.

DETAILED DESCRIPTION OF EMBODIMENTS

Figure 2:
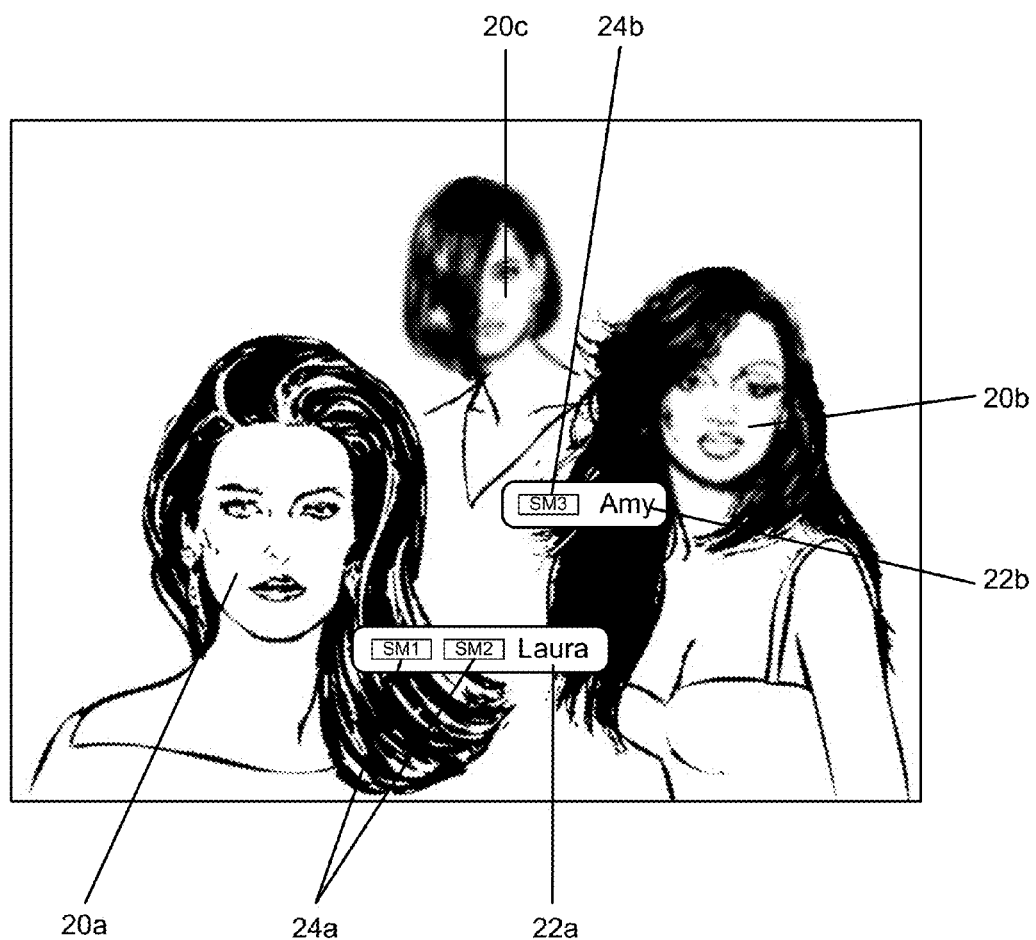
FIG. 2 is an exemplary digital image after image effects have been applied based on weights assigned to the detected faces.

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments. Further, although method descriptions and flow charts may show specific orders of executing steps, the order of executing the steps may be changed relative to the order described. Also, two or more steps described in succession may be executed concurrently or with partial concurrence. One or more of the described or illustrated steps may be omitted.

The present disclosure describes a system and method for applying image effects based on facial detection, social media connections and other metrics to visually distinguish a detected face from other parts of the digital image. Because the image effects applied are, in part, dependent on the social media connections between a target viewer of the digital image and other people detected in the image, the results of the method as applied to a single digital image may differ for each different target viewer. Thus, several different target viewers using the disclosed method may create different personalized versions of the same image that highlight the target viewer's social connections with individuals appearing in the image.

Referring initially to FIG. 1, illustrated is a flow chart diagram that depicts an exemplary method for applying graphical effects to a digital image in an electronic device to visually distinguishing a detected face in digital image. The exemplary method of FIG. 1 may be implemented using coded instructions (e.g., computer readable instructions) stored on one or more non-transitory computer readable media such as flash memory, read-only memory (ROM), random-access memory (RAM), cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. Typical non-transitory computer readable media include electronic memory devices, magnetic memory devices and optical memory devices. The method may be executed by an electronic device operated by an end user or target viewer of digital image, or any other electronic device, or an electronic device operated by a social media network of the target viewer. In one embodiment, to carry out the method, the logical instructions embodying the method are executed by a processor of the electronic device.

The method involves reading and potentially altering one or more digital image files. If the method is performed on more than one digital image file, one or more of the steps may performed on every image file before proceeding to another step, or some or all of the steps may performed on a single digital image file before performing any of the steps on a subsequent image file. The digital image files may be stored in a memory of the same electronic device executing the method, or may be stored elsewhere, such as on an external storage device or a remote server of the user of the electronic device, or on the server of a social media network. The images may be stored as a part of an album or other digital image library. The album may be facilitated by software on the electronic device, or facilitated by a social media network. The method may also create copies of the digital image files involved and save the original image file (before any alteration) or the altered image file in a memory different from the one from which the digital image file was retrieved.

The method may begin at step 10, in which the processor executes logical instructions to detect a face in the digital image. Face detection is well known in the art and face detection software is commercially available. In one exemplary method, known as the Viola-Jones method, the digital image is divided into rectangular blocks, based on a sum of luminosity values for groups of adjacent pixels, and then grouped to form features. The features within a digital image are compared against a database of features known to be indicative of a human face. The comparison may involve several iterations to increase face-detection accuracy.

Once the processor detects a face, it may store, within a memory, the coordinates of pixels representing the face in the digital image. The stored coordinates may comprise at least two pixel coordinate pairs so as to define a polygonal area bounding the detected face. The coordinates may also be a set of all pixels circumscribing the detected face. The face coordinate information may be stored in a file in a memory separate from the digital image itself or as metadata within the digital image file.

The face-detection process at step 10 may be used to detect more than one face in the digital image. While it may be more efficient to detect all faces before moving to another step, it is likewise possible to detect one face at a time and repeat the entire method described herein, for one face at a time, until no more faces are detected in the image. If no faces are detected in the image, the process terminates.

At step 12, the process performs facial recognition on the face detected in the previous step. Facial recognition algorithms are also well known in the art and commercially available. Such algorithms typically involve the comparison of facial features between the detected face and other detected faces in one or more other digital images. When attempting to recognize a detected face in the digital image, the process may draw from any number of sources for comparison. For example, the electronic device may have stored within memory a database of persons and associated facial features. Such a database could be configured to update whenever a digital image with a detected face is tagged so as to associate a detected face with a specific person. The database could be configured to store facial feature information for persons tagged in any image on the electronic device, images in a library or album on the electronic device, or images stored in a library or album of one or more social media networks.

A database of facial features may also be stored by a social media network. Further, the method could access more than one such database stored on one or more social networks, or on the electronic device, or other device, or any combination thereof. It is also possible, at the time of performing the recognition process, to access a set of digital images with detected faces tagged as belonging to one or more people and compare the features of the current detected face to that of the tagged faces in each image in order to find a match. The sources used for comparison may require access to the target viewer's social media service accounts. Such access could be achieved, for example, through APIs (application programming interfaces) provided by the various social media services, software, or electronic devices. A preferred set of sources may be provided as a default with the software. Further, a user may add, remove or edit the sources for facial recognition comparisons.

When a person is recognized from a detected face, a corresponding identifier of the person may be stored in memory. The identifier may be the person's name or some other unique identifier. The identifier may be stored in a file and associated with a set of coordinates representing the location of the detected face in the digital image. The unique identifier and associated coordinate information may be stored in the same file as the face coordinate information created in step 10, it may be stored in a separate file, or it may be stored as metadata within the digital image file.

At step 14, a weight is calculated and assigned to the detected face in the digital image. The weight represents the importance of the face to a target viewer of the digital image. The weight is calculated from factors based on characteristics of the face itself and/or the face's relation to the rest of the image, and also on the level of social media relations between the person identified from the detected face and a target viewer. The weight may be represented by numeric units in any suitable form, such as an integer or decimal number, and may be positive or negative. It should be appreciated that the factors used for the weight calculation are not limited to the exemplary facial characteristics and social media relations described herein. Further, the invention is not limited to any one specific combination of the various factors in order to calculate a weight (or score).

For example, each factor analyzed may be given equal weight in the calculation. In another example, social media relation factors may count for more than factors relating only to the face itself (e.g., position in the image or focus) by allocating an additional multiplier to social media relation factors. Each factor may be represented in the calculation by one or more units, or parts of units. Factors may be summed, averaged, weighted averaged or multiplied to calculate the weight. The manner in which the factors are combined to determine the weight may be fixed or unchangeable in the implementing software and not accessible by a user. In other embodiments, a user may be able to change weights applied to each factor, select the factors to be considered, etc. Each detected face may be assigned a weight based only on its own characteristics, without consideration given to other detected faces in the image. Alternatively, detected face may be assigned a weight that is relative to other detected faces in the image.

In one embodiment, a factor analyzed in the weight calculation is the prominence of the face with respect to the digital image. Prominence may be considered a representation of the proximity of the face to a camera that captured the image at the time the image was captured. Prominence can be measured by calculating the area of the detected face within the image. The area of the detected face may be approximated by the area of a rectangle bounding the entirety of the detected face. Alternatively, the area of the face may be dissected into smaller polygons, the area of each calculated and summed together to derive a total area. The area can further be calculated counting the pixels within the boundary of the detected face. If the detected face is the only detected face in the image, the prominence of the face may be estimated by comparing the area bounded by the face to the area bounded by other objects of known approximate size that may be detected in the image, for example a chair, automobile, or tree. Alternatively, a weight could be based on the area bounded by the detected face compared to total area of the digital image. If more than one face is detected in the image, facial prominence may also be measured as a rank of the area bounded by each face, with largest face receiving the highest rank, the next largest face being ranked second, and so on. The rank may then serve as a basis for the weight calculation.

Instead of, or in addition to facial area, the prominence factor may also consider the position of the face within the digital image. A face may be given a higher weight if it is located closer to the center of the digital image, or a lower weight if it is on the periphery. The method may calculate the center of the digital image and further calculate the distance between that center and a part of the area of the detected face, such as the center of the area of the detected face or the closest boundary point of the facial area. The weight assigned may be a function of the distance of the detected face from the center of the image. If more than one face is detected in the image, facial prominence may also be measured as a rank of the distance of each face from the center of the image, with closest face receiving the highest rank, the next closest face being ranked second, and so on. The rank may then serve as a basis for the weight calculation.

In another embodiment, a factor analyzed in the weight calculation involves further detecting whether the detected face is smiling. Smile detection algorithms are well known in the art and available through commercial software. Smile detection typically takes into account the visibility of teeth within the mouth and curvature of the lips. Smile detection as a factor may be a binary determination. For example, a metric may be derived from the degree to which teeth are visible and the lips are curved. If the metric exceeds a certain threshold value, then the face is determined as smiling and a preset value is added to the total weight assigned to the face. Alternatively, if the metric is below the threshold value, a preset value may be subtracted from the total weight. Further, the weight value may be proportional to the metric itself.

In a further embodiment, a factor analyzed in the weight calculation comprises analyzing the extent to which the detected face is in focus with respect to digital image. The focus of an image can be represented by varying degrees of blur within the image. Parts of the image that are less blurred and more clear can be considered more in focus, whereas parts of the image that are more blurred can be considered more out of focus. Methods for deriving a no-reference metric for degree of blur in an image are known in the art, for example as described in *A No-Reference Perceptual Blur Metric*, Pina Marziliano et al., published in *Proceedings: 2002 International Conference on Image Processing*, vol. 3, IEEE, 2002. A no-reference blur metric algorithm can be run on the area of pixels in, or bounded by a polygon surrounding, the detected face to derive a blur metric for that face. Typically, a higher blur metric denotes a higher degree of blur.

A blur metric, alone or with a multiplier, can be used as a factor in the weight calculation. For example, the blur metric may be subtracted from the total assigned weight, or an inverse of the blur metric may be added to the weight. If multiple faces are detected, the faces can be ranked according to their respective blur metrics and the rank can be used as a basis for the weight value. For example, the clearest detected face, with the lowest blur metric, will have a highest predetermined value added to its weight, the next clearest detected face with next lowest blur metric will have a second highest predetermined value added to its weight, and so on.

In one more embodiment, a factor analyzed in the weight calculation is the degree to which the detected face is facing a viewer of the digital image. Put another way, this factor measures the degree to which the face was facing the camera when the digital image was captured, if the digital image was captured by a camera. The extent to which the detected face is facing the viewer can be calculated by further detecting features of the face, such as the eyes, nose, mouth, etc., and comparing their relative positions to the entire area of the face. For example, if the eyes, nose and mouth are not in the center of the area bounding the detected face, then it is more likely that the face is not facing the viewer of the digital image. The value for the weight calculation may be binary. For example, if the detected face is determined by the position of its features to be facing no further than a certain threshold degree away from the camera, then the weight may be increased by a set amount. Alternatively, the weight could be decreased proportionally based on the degree to which the facial features deviate from the center of the detected facial area.

The method may also consider the direction of eyes of the detected face by detecting the position of the iris and pupil of the eyes of the detected face relative to position of each eye. For example, if a detected face is considered to be facing the camera but the iris and pupils of the eyes are detected at the right side of each eye, then it is likely that the detected face is looking away from the camera and the weight may be decreased accordingly. Similarly, if it is determined, for example, that the face is facing a certain degree to the left of the image rather than facing the viewer, but the iris and pupils are detected at the right side of each eye, then it is likely the detected face is looking at the viewer even though the face is turned, and the value added to the weight may be increased accordingly.

In one embodiment, a factor analyzed in the weight calculation is the quantity of social media contacts between the individual identified form the detected face and the target viewer. Social media contacts may exists between two individuals through any number of various social media services. Examples of social media services include Facebook, Google+, Twitter, LinkedIn, and the like. A contact in social media service would include being friends in Facebook or Google+, following or being followed in Twitter, being connected via LinkedIn, etc. The method may require access to the target viewer's social media service accounts in order to obtain contact information. Such access could be achieved, for example, through web-based APIs provided by the various social media services. The set of social media services to be considered when calculating the weight may be provided as a default with software. Further, a user may add, remove or edit the set of social media services used in a weight calculation.

The quantity of social media contacts between an identified person and a target viewer may factor into a calculated weight by querying a given set of social media services and counting the number of such services in which a contact exists between the identified individual and the target viewer. Further, each social media service could be given a different weight so that a contact through one service would weigh more heavily than a contact through another. Alternatively, each service may be given equal weight. Accordingly, a weight for each social media service in which a contact exists would be added together to calculate the total weight. The value of any specific weight for each service may be hard-coded into the electronic device or software executing the method and also may be manually changed or created by a user of the electronic device or software. Additionally, if multiple faces are detected, the weight could be derived by summing the quantity of social media contacts for each detected face in the image, ranking each face according to its summed total, and using the rank as a basis for the weight value.

In another embodiment, tags of the identified person in an album of the target viewer are analyzed as a factor in the weight calculation. Most social media platforms include a feature for storing digital images, such as digital a photo album. Often digital photo albums allow user to select a region of a digital image corresponding to a specific person and manually "tag" that region of the image as relating to the specific person. The tag information may be stored as metadata with the image itself or in a separate file containing tag information for all photographs in an album. Some digital photo album platforms are also capable of automatically tagging faces in digital images by performing facial recognition comparisons between faces previously tagged by a user and detected untagged faces in other digital images. Such manual and automatic tagging features are not limited to social media platforms, but also available as commercial software for albums stored on personal electronic devices.

The weight value for the detected face may be increased if the person identified from the detected face is tagged in any album of the target viewer, regardless of the number of tags. Alternatively, the number of tags of the identified person in one or more albums of the target viewer may be counted and summed to calculate a weight value. If multiple faces are detected, the weight could be derived by counting the number of tags for each detected face in the image, ranking each face according to its total count, and using the rank as a basis for the weight value.

The method may search for tags in one or more specific albums, in all albums on one or more social media platforms or other digital image libraries, or any combination thereof. If a digital image library contains a file with all tag information, then that file may be parsed to find and/or count tags of the person identified from the detected face. If tag information is not in a single file, than the metadata of each image in the album can be parsed to find and/or count the number of tags for the person identified from the detected face. It is possible that the identifier used by the instant method and the digital library may differ slightly, in which case the method may treat a name as a match if it is similar to a certain degree, for example if it only excludes a middle initial.

In a further embodiment, a factor analyzed in the weight calculation is the frequency of communications between the identified person and the target viewer of the digital image in at least one communication medium. A communication medium for the purposes of this method includes a communication medium that creates a record that could be parsed to determine the number of instances of communications between the target viewer of the digital image and another person. Examples of such communication mediums include text message (e.g. SMS), email, telephone calls, social media message or post, and instant message. The method may require access to the target viewer's social media service accounts and messaging accounts in order to obtain connection information. Such access could be achieved, for example, through APIs provided by the various social media services, software, email programs, text message programs or electronic devices. A preferred set of communication mediums may be provided as a default with the software. Further, a user may add, remove or edit communication mediums used in the weight calculation.

The frequency of communications between an identified person and a target viewer may factor into a calculated weight by parsing a log of communications in that medium. The weight could be based on a percentage of communications with identified person compared to the total number of communications by the target viewer through that medium. The count of communications could be time delimited, for example only to include communications in the past six months or year in the count. Further, each communication medium could be given a multiplier so that a communication through one medium would weigh more heavily than a communication through another. If multiple faces are detected, the weight could be derived by summing the number of communications in one or more mediums for each detected face in the image, ranking each face according to its summed total, and using the rank as a basis for the weight value.

At step 16, the calculated weight may be assigned to the detected face. Assigning the weight involves storing in memory an association between the detected face and the weight. If the detected face coordinates are stored in a separate file, the weight may be stored in the same file as corresponding to the detected face. Alternatively, the weight may be stored in a different file with an associated identifier corresponding to the detected face.

In one embodiment, the assigned weight information is stored as metadata within the digital image. Digital images often contain descriptive metadata within that image file that describes characteristics of the image such as owner and copyright information, exposure information, geolocation information and date of creation. Digital image metadata may also contain keywords and other textual information about the image that allows for a user to search a library of images for specific textual content. There are many standard structures for metadata, for example the Extensible Media Platform (EMP). Many commercial software products are available to read and write EMP metadata and other standard metadata structures.

The method may store detected face location information (i.e. the face's location within the digital image), facial recognition information, and/or weight information as metadata within the digital image file. Detected face location information may be stored as a set of at least two pixel coordinate pairs so as to define a polygonal area bounding the detected face. Alternatively, the detected face location may be the set of the coordinates of all pixels that create the boundary of the facial area. Facial recognition information may be associated with the detected face location information and may be stored as a textual identifier, such as the name of the person identified from the detected face, or any numeric or alphanumeric identifier that could be used by other software or social media platform to identify the person having the detected face.

An assigned weight may be associated with the detected face and/or facial recognition information and may be stored in metadata in a number of different ways. For instance, a single value representing the total weight for a face may be stored. Additionally, the individual totals for one or more weight factors, such as frequency of social media contacts or smile detection may also be stored.

In another embodiment, the method further includes retrieving a digital image from an album of digital images based on metadata stored within the digital images. Retrieving an image may mean copying the image file from one memory to another or returning the address in memory where the image is stored. Information stored in the metadata of images in an album or a group of albums can be searched for information matching a query from a user. For example, a user could submit a query for all images in which a specific person has been identified from a detected face. In response to such a query the method may return all images with metadata including that specific person's name or other unique identifier relating to that specific person.

The method may further consider assigned weights in response to a query for images containing a specific person. For example, the query may return a predicted best image of the specific person by returning the image in which the specific person's detected face has been assigned the highest weight. Additionally, the method may return multiple images of the specific person but in an order determined by the weight assigned to that person's detected face in each image. For example, if a user queries an album for images of "John Doe," the method may find five images in the album with metadata containing the name "John Doe." The method may the return only the image with highest weight assigned to the detected face corresponding to "John Doe." Alternatively the method may return all five images, but with the image where the detected face corresponding to "John Doe" has the highest assigned weight returned first, and the image with lowest weight returned last.

At step 18, at least one image effect is applied to the digital image based on the weight assigned to the detected face to visually distinguish the detected face from other parts of the image. If more than one face is detected, the effect(s) may be repeated for some or all of the faces. Also, the amount or degree to which an effect is applied to each face may depend on the numeric or other value of the weight assigned to that face.

A digital image file is typically represented in memory by a matrix of pixels. Each pixel has a color value represented by multiple color components, such as red, green and blue in an RGB color space, or cyan, magenta, yellow and black in a CMYK color space. The image may be altered by a processor executing logical instructions that change one or more color component values of one or more pixels in the image file, or by increasing or decreasing the number of pixels in the image file. Many image effect software algorithms and packages are commercially available.

In one embodiment, the image effect includes changing the color balance between the detected face and other parts of the image. The image effect may involve changing one or more the color components for some of the pixels within the area of the detected face, some of the pixels outside the area of the detected face, or a combination of both. For example, one or more color components of all pixels within the area of the detected face could be altered to give the detected face a color tint with respect to the rest of the image. Conversely, one or more color components of all pixels in the rest of the image could be altered to tint the rest of the image a certain color and leave the detected face with its original color. Alternatively, the color components could be adjusted to remove color from pixels outside the area of the detected face to convert the outside area to gray scale. Color to gray scale conversion may be accomplished, for example, by averaging two or more of the color components of an RGB color space or zeroing the CMY components of a CMYK color space.

If more than one face is detected, each face, as well as the parts of the image outside any detected faces, may be tinted or shaded in a different color or gray. The tint color or gray shade used for each detected face and the background may be determined by the weight assigned to each face. For example, a default color ranking or user defined color ranking may be used to assign one specific color or shade to the face with highest weight, another color or shade to the face with the next highest weight, and so on, with the background getting a final shade or tint.

In another embodiment, the image effect involves altering the brightness balance between the detected face and other parts of the digital image. The brightness of each pixel within the area of the detected face could be altered by, for example, equally changing the value of all color components in an RGB color space or changing the K component in a CMYK color space. For multiple detected faces, the brightness of the pixels within each detected face, as well as the parts of the image outside any detected faces, could be increased or decreased according the weight assigned to each face. For example, the highest weighted faces could be brightened, the lowest weighted faced darkened, and the background darkened further so as to highlight the more important faces. The degree of brightness or darkness applied to each detected face may be a function of the weight value assigned to that face. Alternatively, the faces may be ranked according to their respective weight and brightened or darkened by a set increment based on rank.

In one more embodiment, the color of the outermost band of pixels within the area of a detected face can be altered to give the effect of a halo or highlight surrounding the face. Similarly, the effect can be achieved by changing the color of the band of pixels immediately outside and surrounding the detected face or a combination of pixels inside and outside the area or the detected face at the edge of the detected face.

In another embodiment, the image effect includes changing the perceived focus of the digital image with respect to the detected face. The perceived focus of a digital image can be changed by blurring parts of the image intended to be out of focus. Many image-blurring techniques are known in the art, for example application of a Gaussian function to an area of pixels in the image.

A detected face could be given increased perceived focus by blurring all parts of the image outside the area of the detected face. The degree of blur applied to the rest of image may be based on the magnitude of the weight assigned to the detected face. For example, if the detected face has a high weight, then the area outside the detected face may be highly blurred. Conversely, if the detected face is assigned a low weight, the area outside the detected face may be only slightly blurred. If multiple faces are detected, each face may be blurred to a different to degree based on the weight assigned to that face. For instance, the detected face with the highest assigned weight may not be blurred at all, the detected face with second highest weight may be blurred only slightly, the detected face with the third highest assigned weight blurred slightly more, and so on. The parts of the image not within the area of any detected faces may be blurred to a degree higher than that of any detected face.

The degree of blur for a detected face may be a function of the weight assigned to that face. Alternatively, the detected faces may be ranked by assigned weight and blurred by a set increment based on rank. In exemplary FIG. 2, for instance, face 20a has not been blurred at all, whereas face 20b has been blurred a slight degree and face 20c blurred to a greater degree. The blur effect may involve blurring each area individually, for example blurring each face and possibly the background independently of each other face. Also, a blur may be applied to all area outside of the first detected face, followed by a second equal blur applied to all area outside both the first and second faces and so on, to achieve a similar effect.

In one embodiment, the image effect includes cropping the imaging in order to retain only some or all detected faces. Cropping involves reducing the size or the image by removing pixels from an outer area of the image. The image may be cropped so as only to include detected faces or a subset of detected faces based on the weight assigned to each face. For example, the image could be cropped to cut out all areas of the image surrounding the detected face with the highest weight. Alternatively, the image could be cropped so as retain an area containing all pixels of more than one detected face. The detected faces retained in the image could be based on the weights of each face or the rank of weights of each face. For instance, the effect could be set to crop out the area outside all faces that do not meet a certain target weight. The method could also crop all pixels of the image outside an area containing the two faces with the highest weight of all detected faces in the image.

The image could be cropped into any shape, including a rectangle, square or circle. The area of pixels to crop could be set so as to crop as closely as possible to the area of pixels in the detected faces or to allow for a buffer of pixels providing some width between the detected faces and the area cropped. Settings determining where and how to crop the image based on the weights of the detected faces may be hard-coded into the electronic device or software executing the method and also may be manually changed or created by a user of the electronic device or software.

In a further embodiment, the image effect includes displaying, near the detected face, information relating to the social media contacts between the person identified from the detected face and the target viewer of the digital image. Exemplary FIG. 2 depicts detected faces 20a-20c with names 26a-26c and social media connection logos 28a-28c displayed near each face. The displayed names 26a-26c may include the first name, last name, full name, nickname, or initials of the person identified from the detected face. If no person is identified from the detected face, displayed names 26a-26c may be a term such as "unknown," indicating that no person has been identified from the detected face. The display may also include a representation of the various social networks through which the identified person and target viewer have a connection. The social network representation could be the full name of the social network, an abbreviation of that name, or some symbol denoting the social network such as logos 28*a* and 28*b*.

The social contact information may be displayed on the image by overwriting pixels near the detected face. The placement of social contact information should be close enough to the detected face so as to associate the information with the face in the mind of a viewer. The social contact information may or may not overlap the detected face or the area immediately surrounding the detected face. The placement of the social contact information may take into account the position of other detected faces and other social contact information displays so as not to overlap them. The social contact information may be displayed in any suitable size or color. The social contact information may further be displayed as text or images over a background of any suitable shape, size or color that may have a border of any suitable thickness or color.

The possible image effects applied to the image based on the assigned weight of one or more detected faces are not limited to the examples of this disclosure. Such effects may also include any number commercially available image effect packages or "fun filters." Examples of such fun filters include, but are not limited to, facial-distortions, stylizations that create comic-like or stencil-like effects, filters that add cartoon features to or around the face, filters that mimic non-visible spectrum coloring like x-ray and thermal imaging, and filters that mimic camera effects like sepia and fish-eye lens distortion.

The above-described method may be performed by an electronic device 30, an example of which is illustrated in FIG. 3. Overall functionality of the electronic device 30 may be controlled by a control circuit 32 that includes a processing device 34. The processing device 34 may execute code stored in a memory within the control circuit 32 and/or in a separate (e.g., memory 36) in order to carry out the operations of the electronic device 30. For instance, the processing device 34 may be used to execute the face detection function 38, face recognition function 40, weight calculation function 42, and image effect function 44. The memory 36 is a non-transitory computer readable medium and may be, for example, one or more of a buffer, a flash memory, a hard drive, a removable media, a volatile memory, a non-volatile memory, a random access memory (RAM), or other suitable device. In a typical arrangement, the memory 36 includes a non-volatile memory for long term data storage and a volatile memory that functions as system memory for the control circuit 32. The memory 36 may exchange data with the control circuit 32 over a data bus. Accompanying control lines and an address bus between the memory 36 and the control circuit 32 also may be present.

The electronic device 30 may further include one or more input/output (I/O) interface(s) 46. The I/O interface(s) 46 may include one or more electrical connectors for connecting the electronic device 30 to: another device (e.g., a computer or mobile phone), via a cable; a wired or wireless network; a user interface including outputs such as a display or speakers or inputs such as a touchscreen, keyboard, or microphone; and/or a power supply.

The electronic device 20 may be a mobile phone, tablet or computer operated by the target viewer for whom the method of analyzing and changing an image is performed. Alternatively, the electronic device 20 may be a server that performs the method as a service to a user of another electronic device.

Although certain embodiments have been shown and described, it is understood that equivalents and modifications falling within the scope of the appended claims will occur to others who are skilled in the art upon the reading and understanding of this specification.

Example

In this example, an application is written and installed on electronic device 20. Electronic device 20 is operated by a social network provider. The application performs facial detection, facial recognition, weight calculation and image effect functions through the processing device 24 of electronic device 20. An album of digital image is stored in memory 26 of the electronic device 20 and is associated with the social media network account of a specific target viewer. A specific digital image from the album is retrieved form from memory 26 to be processed by the application.

Figure 4:
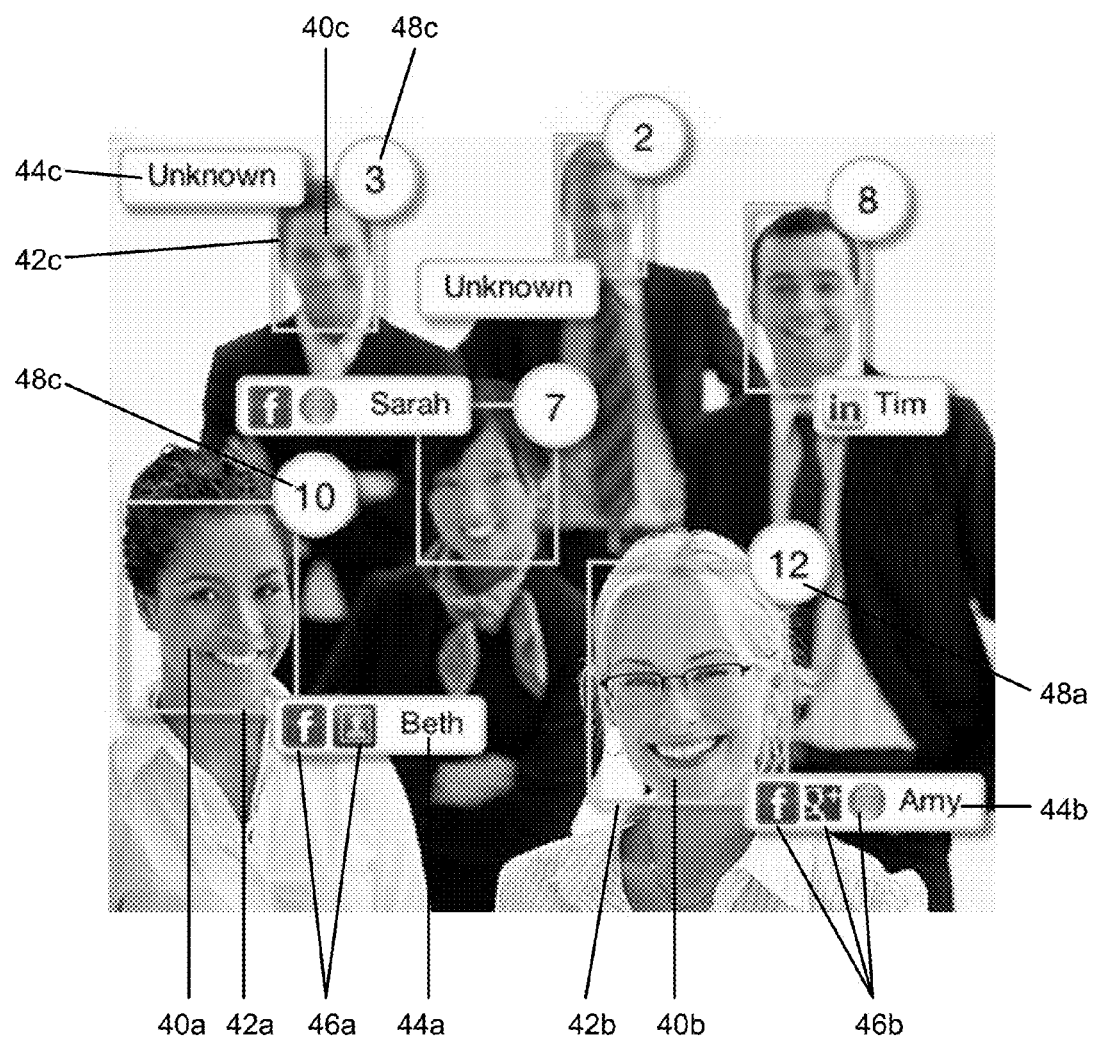
FIG. 4 is exemplary digital image with overlaid graphics representing metadata that may be saved while executing method.

The application begins by detecting faces in the digital image. The application divides the pixels of the digital image into features based on pixel luminosity. The features are compared against a database, stored in memory 26, of features indicative of a face. If the application finds several matches for a feature in the digital image, then the feature is considered to be a detected face. A pair of pixel coordinates representing the upper left corner of the feature and lower right corner of the feature are saved as metadata within the digital image. The application continues this process until all features of the digital image have been analyzed. FIG. 4 illustrates an exemplary digital image with overlaid graphics representing metadata that may be saved while executing method. In FIG. 4, for example, faces 40*a*-40*c* are detected and represented in metadata by bounding boxes 42*a*-42*c*.

The application next runs a facial recognition algorithm for each detected face. In this example, the album of digital images in memory 26 contains a database of all people tagged in at least one image of the album and data representing the facial features of each tagged person. The application first detects features of a detected face, such as the relative size and position of the eyes, nose and mouth, and the shape of the face. The application then parses the facial feature data in memory to find a person with features that are similar to a certain confidence level, perhaps 90%. If a match is found, the name of the person with the matching facial features is stored within the digital image as metadata associated with the pixel coordinates of the corresponding detected face. In FIG. 4, the stored identity of each detected face 40 is represented in metadata by a name 44.

The application is next configured to assign a weight each detected face. In this example, the weight is in the form of an integer value. The weight is increased by one for each of one or more characteristics of the detected face, and is further increased by one or more for each of one or more social media relationships between the identified person and the target viewer. If the social media relationship comprises social media contacts between the identified person and the target viewer, then the weight is increased by one unit for each social media service in which the target viewer has a social media contact with the identified person. If the social media relationship comprises tags of the identified person in an album of the target viewer, then the weight is increased by one unit if the identified person has been tagged in an album of the target viewer. If the social media relationship comprises communications between the identified person and the target viewer in one or more communication mediums, then the weight is increased by one unit for each other person identified from a detected face in the digital image that has a lower frequency of communications with the target viewer in the one or more communication mediums.

Specifically, in this example, the weight calculation is configured as follows:

Increase the Weight by One if a Smile is Detected on the Detected Face.

In this example the application is configured to apply a binary smile detection method. The application detects the mouth of the detected face, the visibility of teeth in the mouth, and the curvature of the lips. A smile metric is created based on the visibility of the teeth and mouth, with 0 meaning no smile is detected and 100 meaning the teeth are fully visible and the mouth is significantly curved upward at the ends. The application is configured so that if the smile metric is at or above 50, the face is considered to be smiling and the total weight for the face is increased by 1.

Increase the Weight by One if the Detected Face is Facing a Viewer of the Digital Image.

The application detects features of the face, including the eyes, nose, and mouth. The application then computes the center of the area of the detected face. The application is configured to consider the eyes to be at center height of the facial area. The application is configured so that if the degree to which the eyes deviate vertically from the center of the area of the detected face is more than 45 degrees, then the face is considered to be looking up or down. Similarly, the center of the nose and mouth are considered to be the horizontal center of the facial area. The application is configured so that if the degree to which the center of the nose and mouth deviate horizontally from the center of the area of the detected face is more than 45 degrees, then the face is considered to be looking left or right. The application is configured so that if the face is not considered to be looking left, right, up or down, then the face is deemed to be looking or facing forward and the total weight for the face is increased by 1.

Increase the Weight by One if the Detected Face is in Focus with Respect to the Digital Image.

In this example the application is configured to apply a binary detection of whether a face is in focus. The application includes a blur-metric algorithm like the one disclosed in Marziliano et al. The blur metric-algorithm returns a value form 0 (no perceived blur) to 100 (fully blurred). If the blur metric for the area of the detected face is less than 25, then the detected face is considered in focus, and the total weight for the face is increased by 1.

Increase the Weight by One for Each Other Detected Face in the Digital Image that is Smaller than the Detected Face.

In this example the application is configured to rank each detected face according to its apparent proximity to the camera that captured the image. The area of each detected weight is calculated by calculating the area of a rectangle bounding the face, with its corners being defined by the coordinates stored in metadata. The detected face with the smallest area has its face increased by 1, the next smallest face has its weight increased by 2, and so on, with the largest face having its weight increased by the total number of detected faces. Faces that are the same or about the same size (within 10 percent) may receive the same value.

Increase the Weight by One for Each Social Media Service in which the Target Viewer has a Social Media Contact with the Identified Person.

In this example, the application is configured to increase the weight for each social media service through which the target viewer and person identified form the detected face are connected. All detected but unidentified faces will have no value added to their total weight. The application utilizes APIs to connect to each of various social media networks and access the target viewer's contacts. The application then searches the contact list of each network to determine if the person identified from the detected face exists in the contact list. The total weight for the face is increased by 1 for each social network contact list in which the identified person is found. As in FIG. 4, each social network 46 having a contact may be stored in metadata.

Increase the Weight by One if the Identified Person has been Tagged in a Album of the Target Viewer.

In this example, because only one album is used both for facial recognition comparison and to look for tags, and because a person can only be identified form an image in which he or she is tagged, it is necessarily true that all identified faces are tagged in the album. Thus, all identified faces will have 1 added to their total weight. In other situations, if different albums are used, this method may have different results for identified faces. All detected but unidentified faces will have no value added to their total weight.

Increase the Weight by One for Each Other Person Identified from a Detected Face in the Digital Image that has a Lower Frequency of Communications with the Target Viewer of the Digital Image in One or More Communication Mediums.

In this example the application is configured to rank each identified face according to the frequency of communications between the person identified from the face and the target viewer. Also in this example, the social network operating the application provides for communication between users by instant message, email message and posting. Memory 26 contains a log of the target viewer's communications for each medium. For each person identified from a detected face, the application parses the communications log for each medium and counts every instance of communication between the target viewer and the identified person. All detected but unidentified faces have no value added to their total weight. The identified face with the least instances of communication with the target viewer has 1 added to its total weight, the identified face with the second least instances of communication has 2 added to its total weight, and so on, with the identified face with the highest instances of communication having its weight increased by the total number of identified faces.

When each weight is calculated according the above exemplary method, each weight is assigned to its corresponding face by storing the numeric total within the digital image as metadata associated with the pixel coordinates of the corresponding detected face. A representation of the assigned weight 48 in metadata is illustrated in FIG. 4.

Next, image effects are applied to the digital image. FIG. 2 depicts an exemplary image after image effects have been applied to detected faces 20*a*-20*c*. In FIG. 2, two distinct image effects are utilized. First, several blurs are applied. In this example, detected face 20*a* has the highest assigned weight, so no blur is applied. Detected face 20*b* has the second highest assigned weight, and a Gaussian blur with a radius of 1.2 pixels is applied to the area inside the box bounding the face. Detected face 20*c* has the lowest assigned weight, and a Gaussian blur with a radius of 1.2 pixels is twice applied to the area inside the box bounding the face.

Second, the first name 22 of each identified person and a list of social media network connections 24 is displayed. The name 22 is in black text. No name is displayed for unidentified face 20*c*. The social media network connections 24 between each identified face and the target viewer are displayed by drawing the logo of each social network to the left of the identified person's name. Both the name 22 and social media network connections 24 are displayed over a white rectangular background with rounded corners and gray border. The name 22 and social media network connections 24 are placed at one of the corners of the box bounding the detected face, so as not to overlap any other detected facial area or name and network information display.

What is claimed is:

1. A method for applying image effects to a digital image in an electronic device that includes a processor configured to execute logical instructions, the method comprising:
   detecting, with the processor, a face in the digital image;
   recognizing, with the processor, the identity of a person having the detected face;
   calculating, with the processor, a weight for the detected face, wherein the weight is calculated by analyzing a characteristic of the detected face and by analyzing a social media relationship between the identified person and a target viewer of the digital image;
   assigning, with the processor, the weight to the detected face; and
   applying an image effect to the digital image based on the weight assigned to the detected face to visually distinguish the detected face from other parts of the digital image.

2. The method of claim 1, wherein the weight assigned to the detected face is calculated by analyzing the prominence of the detected face with respect the digital image.

3. The method of claim 1, wherein the weight assigned to the detected face is calculated by detecting a smile on the face.

4. The method of claim 1, wherein the weight assigned to the detected face is calculated by analyzing the degree to which the face is in focus with respect to the digital image.

5. The method of claim 1, wherein the weight assigned to the detected face is calculated by analyzing the extent to which the face is facing a viewer of the digital image.

6. The method of claim 1, wherein the weight assigned to the detected face is calculated by analyzing the quantity of social media contacts between the identified person and the target viewer.

7. The method of claim 1, wherein the weight assigned to the detected face is calculated by analyzing tags of the identified person in an album of the target viewer.

8. The method of claim 1, wherein the weight assigned to the detected face is calculated by analyzing the frequency of communications between the identified person and the target viewer in at least one communication medium.

9. The method of claim 1, wherein the weight assigned to the detected face is a sum of units calculated by:
   increasing the weight by one unit for each of one or more characteristics of the detected face; and
   increasing the weight by one or more units for each of one or more social media relationships between the identified person and the target viewer.

10. The method of claim 9, wherein, if the social media relationship comprises social media contacts between the identified person and the target viewer, then the weight is increased by one unit for each social media service in which the target viewer has a social media contact with the identified person.

11. The method of claim 9, wherein, if the social media relationship comprises tags of the identified person in an album of the target viewer, then the weight is increased by one unit if the identified person has been tagged in an album of the target viewer.

12. The method of claim 9, wherein, if the social media relationship comprises communications between the identified person and the target viewer in one or more communication mediums, then the weight is increased by one unit for each other person identified from a detected face in the digital image that has a lower frequency of communications with the target viewer in the one or more communication mediums.

13. The method of claim 1, wherein the weight assigned to the detected face is a sum of units calculated by:
   increasing the weight by one unit if a smile is detected on the detected face;
   increasing the weight by one unit if the detected face is facing a viewer of the digital image;
   increasing the weight by one unit if the detected face is in focus with respect to the digital image;
   increasing the weight by one unit for each other detected face in the digital image that is smaller than the detected face;
   increasing the weight by one unit for each social media service in which the target viewer has a social media contact with the identified person;
   increasing the weight by one unit if the identified person is tagged in an album of the target viewer; and
   increasing the weight by one unit for each other person identified from a detected face in the digital image that has a lower frequency of communications with the target viewer in one or more communication mediums.

14. The method of claim 1, wherein the assigning comprises storing the weight as metadata within the digital image.

15. The method of claim 14, the method further comprising retrieving a digital image from an album of digital images based on metadata stored within the digital images.

16. The method of claim 1, wherein the image effect is one or more of:
   altering the color balance between the detected face and other parts of the digital image;
   altering the brightness balance between the detected face and other parts of the digital image; or
   changing the focus of the detected face with respect to the digital image.

17. The method of claim 1, wherein the image effect includes displaying, near the detected face, information relating to the social media contacts between the identified person and the target viewer.

18. An electronic device comprising:
   a memory; and
   a control circuit configured to:
      access a digital image stored the a memory;
      detect a face in the digital image;
      recognize the identity of a person having the detected face;
      calculate a weight for the detected face, wherein the weight is calculated by analyzing a characteristic of the detected face and by analyzing a social media relationship between the identified person and a target viewer of the digital image;
      assign the weight to the detected face; and
      apply at least one image effect to the digital image based on the weight assigned to the detected face to visually distinguish the detected face from other parts of the digital image.

19. A non-transitory computer readable medium storing a computer program that, when executed is configured to:
   access a digital image stored in a memory;
   detect a face in the digital image;
   recognize the identity of a person having the detected face;
   calculate a weight for the detected face, wherein the weight is calculated by analyzing a characteristic of the detected face and by analyzing a social media relationship between the identified person and a target viewer of the digital image;

assign the weight to the detected face; and apply at least one image effect to the digital image based on the weight assigned to the detected face to visually distinguish the detected face from other parts of the digital image.

\* \* \* \* \*